(12) United States Patent
Raty

(10) Patent No.: US 8,989,364 B2
(45) Date of Patent: Mar. 24, 2015

(54) TELECOMMUNICATION SYSTEM WITH ENHANCED IMPLEMENTATION OF SERVICE OPERATIONS

(75) Inventor: Matti Raty, Espoo (FI)

(73) Assignee: Navigil Oy, Espoo (FI)

( * ) Notice: Subject to any disclaimer, the term of this patent is extended or adjusted under 35 U.S.C. 154(b) by 616 days.

(21) Appl. No.: 12/810,909

(22) PCT Filed: Dec. 22, 2008

(86) PCT No.: PCT/FI2008/050783
§ 371 (c)(1),
(2), (4) Date: Jun. 28, 2010

(87) PCT Pub. No.: WO2009/083649
PCT Pub. Date: Jul. 9, 2009

(65) Prior Publication Data
US 2010/0284335 A1    Nov. 11, 2010

(30) Foreign Application Priority Data
Dec. 28, 2007    (FI) ...................................... 20075972

(51) Int. Cl.
*H04M 7/00*    (2006.01)
*H04M 3/42*    (2006.01)

(52) U.S. Cl.
CPC ............ *H04M 3/42* (2013.01); *H04M 2242/14* (2013.01); *H04M 2203/1075* (2013.01); *H04M 2203/1008* (2013.01)
USPC ............ 379/211.02; 379/221.08; 379/221.09; 379/233

(58) Field of Classification Search
None
See application file for complete search history.

(56) References Cited

U.S. PATENT DOCUMENTS

| 6,674,849 | B1 * | 1/2004 | Froeberg .................. 379/201.06 |
| 6,771,947 | B1 * | 8/2004 | Griffiths ..................... 455/404.1 |
| 6,944,444 | B1 * | 9/2005 | Gillespie et al. .............. 455/417 |

(Continued)

FOREIGN PATENT DOCUMENTS

| JP | 2005174224 A | 6/2005 |
| WO | 03/067861 A | 8/2003 |

(Continued)

OTHER PUBLICATIONS

International Search Report in Corresponding Application No. PCT/FI2008/050783 Dated Jun. 26, 2009.

(Continued)

*Primary Examiner* — Faruk Hamza
*Assistant Examiner* — Andrew Oh
(74) *Attorney, Agent, or Firm* — Young & Thompson

(57) ABSTRACT

A telecommunication system includes a first node, a second node and a network. The first node is configured with a set of predefined functions and a group of addresses of the telecommunication network such that a session setup request targeted to any address in the group of addresses is routed to the first node, and each address in the group of addresses is associated with at least one of the predefined functions. The second node is configured to send a session setup request to a target address that corresponds to an address in the group of addresses. The first node is configured to determine the function to be performed on the basis of the target address in the session setup request. Information delivery from the second node to the first node is implemented quickly. In the second node the power consumption may be significantly reduced.

24 Claims, 7 Drawing Sheets

(56) References Cited

U.S. PATENT DOCUMENTS

| | | | |
|---|---|---|---|
| 6,993,119 B1* | 1/2006 | Zhang et al. | 379/88.01 |
| 7,072,653 B1* | 7/2006 | Sladek et al. | 455/432.3 |
| 7,242,754 B2* | 7/2007 | Adams et al. | 379/201.02 |
| 2002/0021696 A1 | 2/2002 | Minborg | |
| 2002/0042278 A1* | 4/2002 | Crockett et al. | 455/456 |
| 2003/0123629 A1* | 7/2003 | Hussain et al. | 379/207.02 |
| 2004/0090954 A1* | 5/2004 | Zhang et al. | 370/352 |
| 2005/0053206 A1* | 3/2005 | Chingon et al. | 379/88.19 |
| 2005/0063353 A1* | 3/2005 | Anderson et al. | 370/346 |
| 2005/0195957 A1* | 9/2005 | Gibson | 379/211.02 |
| 2005/0202801 A1* | 9/2005 | Banet et al. | 455/404.1 |
| 2005/0249343 A1* | 11/2005 | Birch | 379/142.01 |
| 2005/0249344 A1* | 11/2005 | Mueller et al. | 379/207.15 |
| 2006/0133582 A1* | 6/2006 | McCulloch | 379/45 |
| 2006/0133592 A1* | 6/2006 | Moss et al. | 379/210.02 |
| 2007/0127664 A1* | 6/2007 | Nimmagadda | 379/201.01 |
| 2007/0201619 A1* | 8/2007 | Zhong et al. | 379/15.02 |
| 2007/0287410 A1 | 12/2007 | Bae et al. | |
| 2008/0095343 A1* | 4/2008 | Cheng et al. | 379/114.28 |
| 2008/0096553 A1* | 4/2008 | Saksena et al. | 455/426.2 |
| 2008/0159515 A1* | 7/2008 | Rines | 379/221.08 |
| 2008/0311961 A1* | 12/2008 | Cotevino et al. | 455/574 |
| 2008/0318545 A1* | 12/2008 | Kazmi | 455/406 |

FOREIGN PATENT DOCUMENTS

| | | |
|---|---|---|
| WO | 2004012439 A1 | 2/2004 |
| WO | 2007129989 A | 11/2007 |

OTHER PUBLICATIONS

Finnish Search Report in Corresponding Application No. 20075972 Dated Oct. 31, 2008.

* cited by examiner

TELECOMMUNICATION SYSTEM WITH ENHANCED IMPLEMENTATION OF SERVICE OPERATIONS

FIELD OF THE INVENTION

The present invention relates to telecommunications, and more particularly to enhanced method of implementing service operations in telecommunications system.

BACKGROUND OF THE INVENTION

Communication based services are based on interaction between at least two communicating endpoints. Typically a service operation involves a series of messages exchanged between the communicating endpoints and the amount of communicated information is relatively high. In some service applications, however, the amount of information exchanged at one time is very small.

For example a tracking service is a communication-based service that involves a tracking device used as user equipment by the subscriber of the service, and a control node. The control node and the user equipment need to exchange information and therewith trigger service operations in one end or in both ends. The amount of exchanged information at one time is fairly small, for example from the user end to the control node:
  scheduled system message indicating location of the user equipment
  scheduled system message indicating battery status of the user equipment
  entry or departure message of a known location
  alarm based on breach of condition.
Correspondingly, information from the control node may comprise:
  a request for an unscheduled report or measured value
  information on a parameter to be changed.

Conventional tracking services apply short messages, General Packet Radio Service (GPRS) transmissions or circuit switched data calls to deliver the required messages. None of these are actually ideally suited for the purpose.

Short messages represent a variety of store and forward type of messaging services, where the message is first delivered to a short message system centre and the centre delivers the message to the targeted endpoint. The short messages are easy to compose and manage and they are widely used in services, especially in tracking services. However, the delivery of short messages may be delayed due to, for example, congestion in the network or in the short message centre. Typically in critical situations and major holidays the short message centres are not able to handle all the traffic. In some services, including the advanced tracking services, such delays are not acceptable.

The problem with GPRS-based communication is that the handshake process required for assigning a unique IP address for the user equipment and passing this IP address to the control node consumes relatively long period of time. The user equipment needs to be in an active mode during these operations, which means that the power consumption increases significantly when the amount of transmissions gets higher. The same problem concerns circuit switched data calls, where the wireless transmitter needs to be on during the duration of the data call. High power consumption is in general an highly disliked feature, and in tracking devices where the dimension of the apparatus is a critical factor for the service it may be the decisive issue that mandates whether a service succeeds or not.

Furthermore, these conventional communication mechanisms are typically charged on a rate basis. However, subscribers of the tracking services are typically not willing to commit to operations where they do not have a direct control to the amount of transmitted messages, meaning to the size of their monthly bill. Mechanisms that would better adjust to flat fee charging are continuously looked for.

SUMMARY OF THE INVENTION

An object of the present invention is to provide a method and an apparatus for implementing the method so as to solve at least one of the above problems. The objects of the invention are achieved by a system, a network node, user equipment, a method and a computer program product, which are characterized by what is stated in the independent claims. The preferred embodiments of the invention are disclosed in the dependent claims.

The invention is based on the idea of delivering the required information within session setup request that is one of the early signaling messages exchanged between the user equipment and the network. In order to accomplish this, one of the endpoints is configured to be reached through a plurality of addresses of the telecommunications system. Each of these addresses are associated with a an operational function of the service such that the operational function may be invoked in one end of the system by sending a session setup request whose target address corresponds to the function to be initiated.

The invention provides a very rapid mechanism to exchange information, especially for a variety of services that apply brief messages. The invented solution provides also several other advantages that are discussed in more detail with the specific embodiments of the invention.

BRIEF DESCRIPTION OF THE DRAWINGS

In the following the invention will be described in greater detail by means of preferred embodiments with reference to the attached drawings, in which.

DETAILED DESCRIPTION OF THE INVENTION

It is appreciated that the following embodiments are exemplary, and although the specification may in various places refer to "an", "one", or "some" embodiment(s), reference is not necessarily made to the same embodiment(s), or the feature in question does not only apply to a single embodiment. Single features of different embodiments may be combined to provide further embodiments.

The present invention is applicable to any communication system that provides delivery of data streams between at least two communicating endpoints. A variety of systems applying a variety of communication technologies may be used separately or in combinations to implement the embodiments of the invention. Communication systems and technologies evolve continuously, and embodiments of the invention will require a number of modifications obvious for a person skilled in the art. All words and expressions of this specification are therefore intended to illustrate, not to restrict, the embodiments, and should be interpreted broadly.

Figure 1:
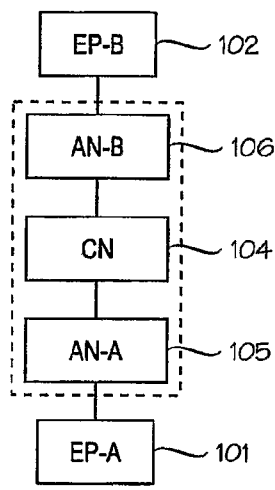
FIG. 1 illustrates an embodiment of a communication system.

In the following, some embodiments of the invention will be described by means an exemplary communication system that provides wide area connectivity to mobile user equipment, however, without restricting the embodiment to any particular connectivity type. An embodiment of a communication system according to the present invention is illustrated in FIG. 1. It should be noted that only elements necessary for illustrating the invention are shown. It is apparent to a person skilled in the art that actual systems comprise functions and structures that for conciseness are not discussed or depicted in more detail herein. The configuration shown in FIG. 1 is a logical representation of an embodiment of the present invention and identifies functional entities thereof. Each of the functions may be realized in a single physical entity or be distributed over multiple physical entities.

FIG. 1 illustrates a first endpoint 101 and a second endpoint 102 that are configured to communicate over a communication network 103. A communication network 103 typically comprises at least one or more core networks 104 that provide network services, and one or more access networks 105, 106 through which user equipment access these core network services. Core network 104 represents a transmission facility that interconnects lower-speed distribution networks, like access networks. Access networks 105, 106 provide final transmission laps to terminal endpoints 101, 102. The first and the second endpoints represent herein system elements that source and sink data streams of a defined protocol layer. An endpoint may be implemented in any fixed, mobile or portable device with connectivity to at least one access network of the communication network 103.

When used for subscribed services, user equipment typically comprises actual terminal equipment and an identification element that allows associating the subscriber with the terminal element he or she is using. The identification element may be any type of data storage accessible to the terminal equipment for retrieving defined subscriber related data. As is clear to a person skilled in the art, the identification element may be implemented in various ways. For example, the identification element may be an integrated unit of the user equipment or a detachably connected identification card, also called a subscriber identity module. The identification element may alternatively be implemented by a software component included in the terminal element that maps one of the network protocol identifiers, for example a media access control (MAC) address of the communication path to the subscriber information of the user. The terminal equipment may be any equipment or a combination of several pieces of equipment, connected to provide a connection with the access network. In the following, the term user equipment thus refers to an entity formed by any type of identification element and terminal equipment.

Wide area connectivity refers to an arrangement where mobile user equipment accesses services of the core network over a cellular radio access network where individual cells are formed by base stations. While within the coverage of the cell, user equipment communicates via the respective base station. Coverage areas formed by a cluster of cells form radio network subsystems that are applicable to be used as access networks 105, 106 of FIG. 1. Radio network subsystem typically comprises one or more radio network controllers responsible of one or more base transceiver stations. A radio network controller is a network node responsible for the control of the radio resources of one or more base transceiver stations and interfaces the core network 104. The base transceiver station performs air interface layer processing (for example, channel coding and interleaving, rate adaptation, etc.) to interface with user equipment.

It should be noted that the configuration of FIG. 1 is an exemplary structure of two endpoints that reside in different radio access networks. For a person skilled in the art it is clear that endpoints may also reside in the same radio access network, or that access in one or both of the access networks may be of some other fixed or wireless type, as will be discussed later.

Mobile user equipment typically operates in different modes. The highest power consumption is associated with transmission and reception modes, whereas various kinds of standby or idle modes enable connectivity but with significantly reduced power levels. In the following a mode needed to transmit information to the network and/or receive information from the network is referred to as transceiving mode.

A basic step of communication between two endpoints is a session setup request. A session setup procedure in this context thus refers to any exchange of one or more signaling messages performed to initiate a communication link between two endpoints of a communications system. A session setup request refers to a message exchanged in the session setup procedure. Examples of session setup procedures comprise call connections, session invitations, and the like. In the present embodiment the delivery of information from the user equipment to a defined network node is enhanced by using the session setup request as a signaling message that delivers the necessary information from the user equipment to a network node. This makes the communication significantly quicker and the user equipment needs to remain in the transceiving mode only for a period required to send a session setup request. Preferably, but not necessarily, some kind of acknowledgement from the network side is also expected such that the user equipment wait that the message has at least been successfully forwarded for transmission to the other endpoint before it exits the transceiving mode. However, the acknowledgement does not necessarily have to be from the receiving endpoint. In case the applied network is stable and reliable, an acknowledgement from an intermediate node, for example a base station or a mobile switching center, may be accepted as a trigger to exit from the transceiving mode.

A session setup request is in general a strictly formatted signaling message and without substantial changes to the applied communications system able to deliver only one semantic meaning. This kind of use for session setup request is actually known from the state of the art as a manual 'parent ping' that cost-conscious teenagers use to save their phone bill. A single alert from child's number is sometimes used to inform parents that caller is, for example, ready to be picked up from a previously agreed spot. Such an arrangement is, however, heavily dependent on one predefined agreement and is naturally not applicable as a basis of communication for a service offered for several users.

In order to achieve adequate applicability to practical network services, one of the network nodes in the system is associated with a group of more than one addresses of the applied telecommunication system such that a session setup request targeted to any address in this group of addresses is routed to said network node. Each of these separate addresses is associated in the network node with a semantic meaning to the service such that this semantic meaning can be used to control the operation of the service. Basically this means that by interpreting the target address in a received session setup request, the network node may determine which operational function of the service it needs to initiate. The interpretation may be implemented in the control node or in any appropriate intermediate node between the transmitting endpoint and the control node, as will be discussed herein.

Figure 2A:
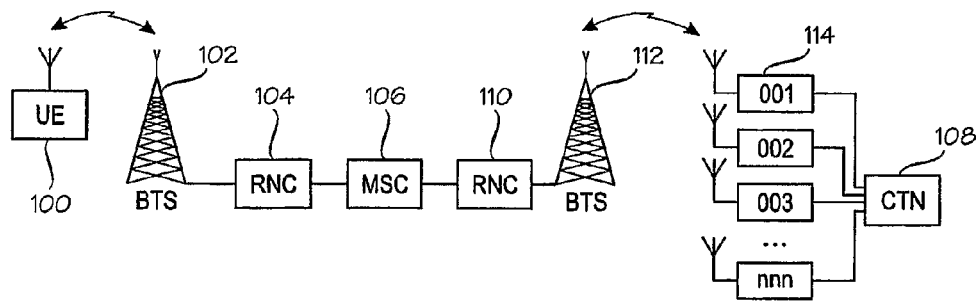
FIGS. 2A to 2D illustrate exemplary system configurations applied in an embodiment of the invention.

FIGS. 2A to 2D illustrate exemplary configurations where the control node itself is configured to be reached through a number of target addresses. This allows the interpretation between target addresses and operational functions also to be made in the control node. The configurations correspond with the embodiment of FIG. 1 such that the first endpoint is a user equipment 100 and the second endpoint is a control node 108. The user equipment 100 is a mobile station such that the access network of the user equipment 100 is a radio access network. Accordingly, while in the cellular coverage of a base station 102, the user equipment 100 may communicate with the base station over the radio interface. The base station 102 connects to the core network (here the mobile switching center 106) through a radio network controller 104. In the example of FIG. 2A, a control node 108 connects to the core network through radio access network. This means that the second endpoint resides in a cell of another base station subsystem that comprises a base station 112 and a radio network controller 110. It should be noted that the presented configurations are shown to illustrate one possible embodiment. The types and configurations of the endpoints and access networks may be varied, as such, without deviating from the scope of protection.

The routing to one network node through a plurality of addresses is implemented in the embodiment of FIG. 2A by means of a plurality of wireless modems, each of them assigned with a separate target address. In the configuration of FIG. 2A this target address is advantageously a mobile subscriber international ISDN number (MSISDN) that uniquely defines the wireless modem.

Figure 2B:
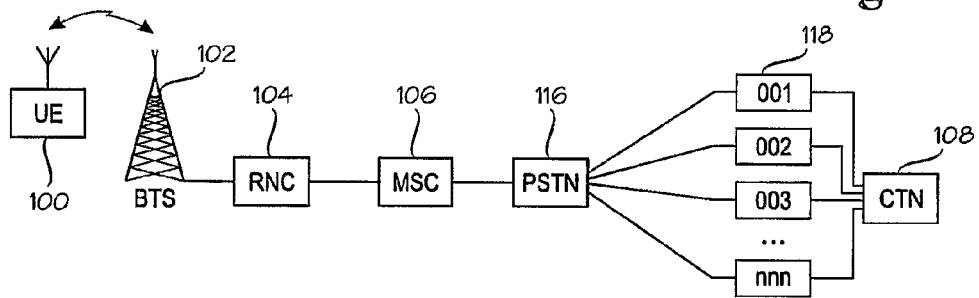

FIG. 2B shows an alternative configuration for an arrangement where the control node connects to the core network through a fixed network, here public switched telephone network (PSTN) 116. The routing to the one network node through a plurality of addresses is implemented by means of a plurality of PSTN modems, each of them assigned with a separate target address. In the configuration of FIG. 2B this target address may be, for example, an ISDN number that uniquely defines the PSTN modem.

Figure 2C:
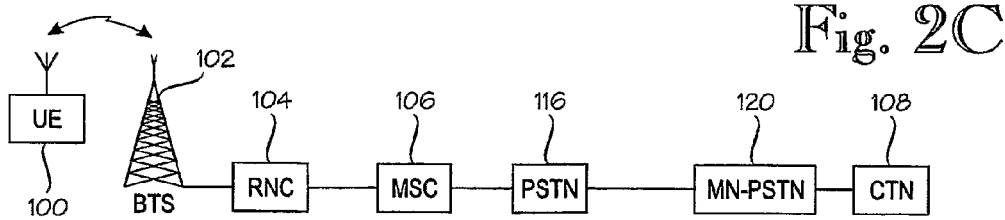

FIG. 2C shows an exemplary configuration for an arrangement where the control node connects to the core network through PSTN 116, but the routing to the one defined network node via a plurality of addresses in is implemented by means of a private automatic branch exchange (PABX) 120, adapted to manage a plurality of separate target addresses.

Figure 2D:
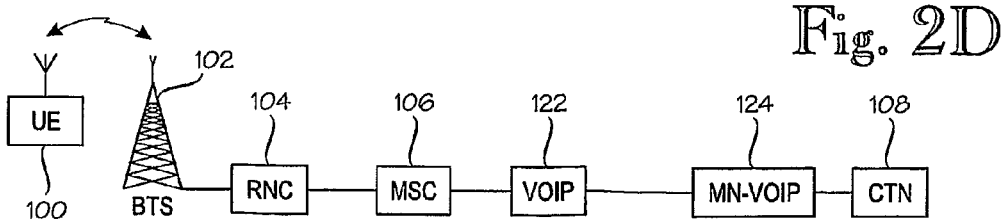

FIG. 2D shows an exemplary configuration for an arrangement where the control node connects to the core network through VoIP network 122, but the routing to the one defined network node via a plurality of addresses is implemented by means of a Voice-over-Internet-Protocol (VoIP) gateway (also called as IP-PBX) 124, assigned with a plurality of separate target addresses.

It should be noted that the control node may also apply a combination of different types of modems or other types of devices to which an address of the telecommunication system may be assigned. Use of different access types for accessing the control node reduces dependency from one communication technology and therefore improves redundancy of the system.

Figure 3A:
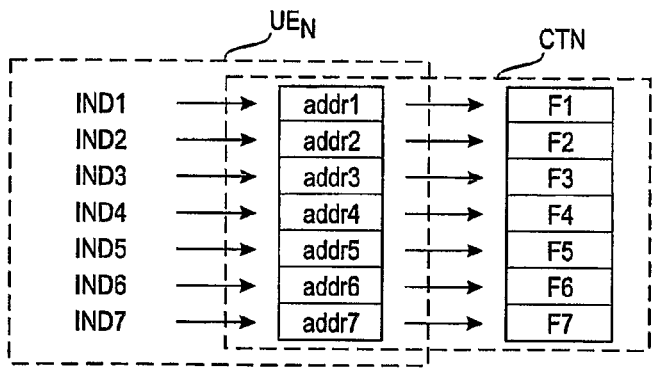
FIGS. 3A and 3B illustrate exemplary mapping schemes between the operational functions of the service and target addresses in the embodiment of FIGS. 2A to 2D.
Figure 3B:
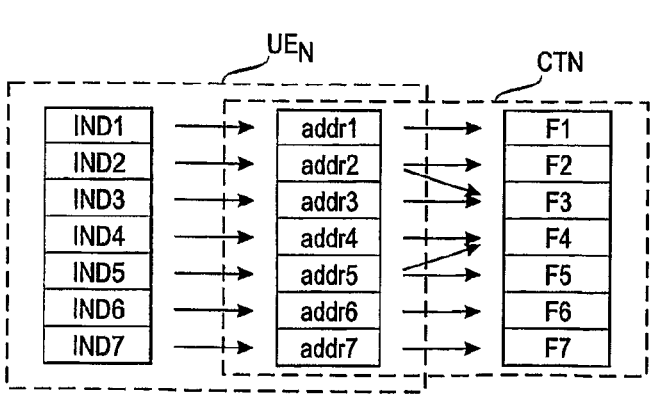

FIGS. 3A and 3B illustrate exemplary mapping schemes between the operational functions of the service and target addresses in the embodiment of FIGS. 2A to 2D. As discussed above, in this type of arrangement the semantic meaning to be associated to an identified target address needs to be explicit, which means that the information received from the user equipment through single address is inevitably of binary nature. However, the target address acts as a link between a semantic meaning associated to a service operation in the user end and in the control node end.

The user equipment stores information on predefined indications IND1. IND7 that associate to a service operation and are available in the user equipment end. These indications may be activated, for example, by the user or through the user interface of the terminal, or by an application through an application programming interface. Each of these indications correspond to an operational function of the service operation in the user end and are mapped in the user equipment to a target address addr1, . . . , addr7. For example, in a user equipment of a person the set of indications could comprise alternatives:

IND1—entered home
    IND2—left school
    IND3—callback request
    IND4—battery status low
    IND5—sensor n value too high
    IND6—emergency—help required immediately
    IND7—minor emergency—call at earliest convenience.

When any of these indications is activated in the user terminal, the indication is mapped to the corresponding address, and a session setup request to that number is generated and transmitted from the user equipment to the network.

As discussed above, the type of the endpoints may be varied without deviating from the scope of protection. For example, in case the other endpoint is not user equipment but a radio terminal integrated to an automatic vending machine, the set of indications could comprise alternatives:

IND1—dispensed one unit of diet soft drink X
    IND2—dispensed one unit of normal soft drink X
    IND3—need service.

In the control node end, the same addresses addr1, . . . , addr7 are stored with a group of operational functions F1, . . . , F7 that correspond with the same service operation as the user equipment indications. A function represents here a procedure that may comprise one action or a group of consecutively performed actions. In a simple case the indication relates to a data indication (like 'entered home' or 'dispensed one unit of diet soft drink X') and the function comprises an action to store the information conveyed by the indication to an appropriate record or forward the information to a predefined address. Alternatively, the indication may relate to an operational situation that triggers a plurality of actions (for example, call the guardian, call the emergency service, update patient's case record, trigger monitoring of call acknowledgements, etc.).

On the basis of the target address, the network routes the session setup request sent by the user equipment to the control node. When the session setup request reaches the control node, the control node maps the target address to the operational function and performs it. FIG. 3A illustrates an option where mapping between the addresses and functions in the control node end are explicit such that one function corresponds to one address. FIG. 3B illustrates an alternative option where functions are generic, and one address may be mapped to one or more consecutively or parallelly performed functions.

Figure 4:
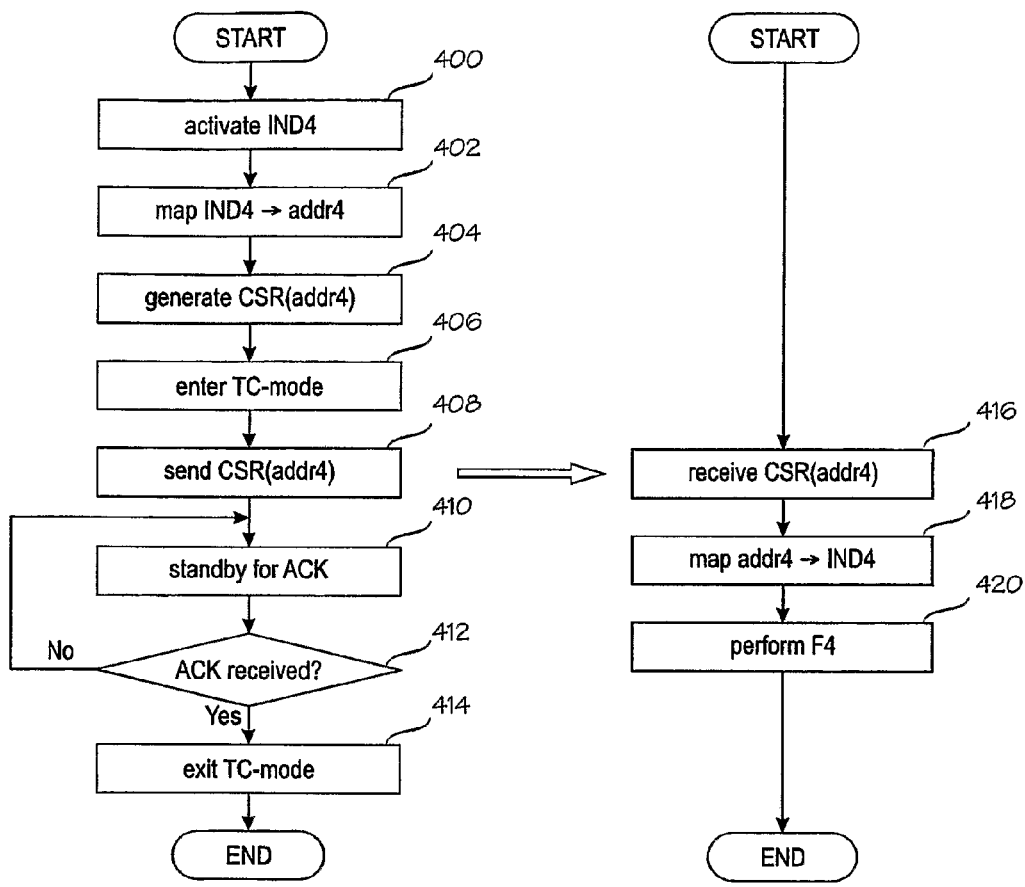
FIG. 4 illustrates stages of an exemplary method implemented in the user equipment and the control node.

FIG. 4 illustrates stages of an exemplary method implemented in the user equipment and the control node in a system according to embodiments 2A and 3A. The procedure in the user equipment begins in a stage where the user equipment is in one of its standby modes, i.e. not in the transceiving mode. The user equipment comprises an application that monitors the battery level of the user equipment, and is configured with a threshold value such that when the battery level of the user equipment gets lower than the threshold value, the indication IND4 'battery status low' is activated (step 400). The user equipment maps (step 402) the indication IND4 to the corresponding target address 'addr4' and generates (step 404) a call setup message using the determined number 'addr4' as the target number, also called as B-subscriber number. The user equipment enters (406) transceiving mode and transmits (step 410) the generated call setup request to the network. After sending the call setup request the user equipment remains in the transceiving mode and is standby (step 410) for receiving an acknowledgement to the call setup request from the network. The network may operate conventionally, and according to the conventional cellular standards, the mobile switching center (MSC) acknowledges the call setup request by sending an acknowledgement message through the base station subsystem to the user equipment. When this acknowledgement message reaches the user equipment (step 412), it exits the transceiving mode.

In the control node end, the procedure begins when the control node is operational and standby for messages from user equipment of subscribing users. The target address 'addr4' is a MSISDN number, and the MSC may continue the call setup procedure conventionally towards the wireless modem to which the MSISDN number 'addr4' is assigned. This number routes the call to the control node that receives the call setup request (step 416), and maps (step 418) the targeted number 'addr4' to the operational function 'F4'. It is clear that a call setup request conventionally also comprises the number of the calling subscriber that the control node extracts such that the function 'F4' may be performed with or to relevant subscriber information.

Let us assume that the network service is a tracking service designed to help a mildly handicapped youngster to get safely through his daily routines. In order to ensure that help is always reachable the service is configured such that when a 'battery status low' message is received from the user equipment, the control node will send a notification to an officer responsible of the youngster to change the battery within the next 24 hours. In the embodied case, the operational function 'F4' thus divides into sub-functions:

F41: identify responsible officer of the calling subscriber
F42: send a notification informing on the battery low status to the responsible officer and request acknowledgement
F43: terminate after acknowledgement from the responsible offer.

This group of sub-functions is activated by the control node when it receives a call setup request to number 'addr4'. The exemplary sub-functions are run consecutively, but depending on the application, sub-functions may naturally also run in parallel. For example, in case 'F4' also comprised a sub-function 'F44: call mother', this sub-function could be implemented at any stage of the procedure.

With the illustrated configuration, information that has a clear semantic meaning associated to the same service operation in both endpoints can be delivered to the control node quickly but without compromising the reliability of the information delivery. Typically only connected calls are charged and therefore also costs related to information delivery of the service can this way be kept very low. For example, a reasonable monthly flat fee for this type of communication may be agreed with the network operator. Due to the very short transmission time, the power consumption of the user terminal can achieve an ultra-low level.

Figure 5:
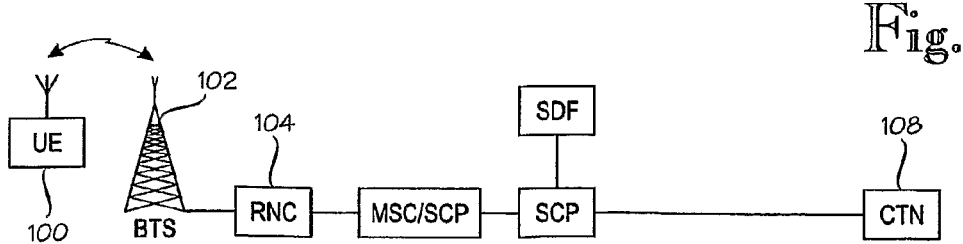
FIG. 5 illustrates an alternative configuration where the network is an intelligent network.

FIG. 5 illustrates an alternative configuration where the network is an intelligent network (IN). In this embodiment the elements in the user equipment end correspond to the elements of FIGS. 2A to 2D and are denoted with the same reference numerals.

In general, an intelligent network IN is a network architecture attached to a basic network (fixed or mobile network), which enables a flexible implementation and control of services. This is achieved by moving the control of the services away from the switching centre to a separate intelligent network functional unit such that services can be made independent of the operation of the basic network, and the structure and software of the basic network need not be altered every time services are changed or added. In an intelligent network, there can be several operative service providers in addition to the actual network operator.

In the IN model, the control of services is moved from the switching centre of the basic network to a service control function (SCF) or a service control point (SCP) 124 in the intelligent network. The service control function contains the service logic and any control related to the service, for instance, the necessary database and service logic programs. The service control function can be a solely logical function, which can be seen as uniform from the viewpoint of a service switching point SSP. However, SCF can be implemented in various ways internally, it can be distributed internally and the service logic related to it can be distributed into different nodes. The service data can also be distributed into other network nodes than the service logic. For instance, the service control function or point (SCF/SCP) can be distributed internally so that it only provides an open interface (such as CORBA, Common Object Request Broker Architecture) to an external server provided by an external service provider. In such a case, the SCP and the external server together form the service control function.

The service switching point (SSP) 124 in FIG. 5 is the mobile switching centre of the basic network. SSP executes a service switching function (SSF), i.e. identifies the intelligent network service and initiates interworking with the service control point SCP. It should be noted that in other type of configurations the SSP can also be a network element of another kind, such as the node responsible for the establishment of the connection in a VoIP protocol (Voice IP), i.e. a H.323 Gatekeeper. When a call setup request including an intelligent network service is made, the service switching point SSP manages the connection.

In order to enable detection and initiation of intelligent network services, a call state model (BCSM) describing the call control operation is maintained in SSP. BCSM may comprise detection points for various services. When SSP detects a detection point in BCSM, it hands over the control to the SCP and then waits for responsive operations from the SCP. When an intelligent network service is triggered at the service control point SCP, the service logic program SLP is initiated, and its operation determines the instructions, which the SCP sends to the SSP in each call phase. The SSP interprets the received instructions and implements the call control functions required by them.

The embodiment applying IN may be arranged to correspond with the configurations of the earlier FIGS. 2C and 2D such that SCP 124 acts as a bridge to which session setup requests targeted to a plurality of numbers are directed to, and forwards these requests as such to CTN 108 that makes the interpretation between the target address and the operational function, as described above. It is also possible to configure the SCP to comprise a service data function (SDF) 126, which basically corresponds to a database accessible to the SCP 124. The service logic programs of SCP can request and update data in the SDF 126. Information allowing mapping between the target addresses and operational functions may be stored in the SDF and used for implementing the mapping between the target addresses and the functions such that SCP may forward to the control node CTN a readily processed command to perform the desired function, as will be discussed in the following. Accordingly, when SSP encounters a detection point, it invokes a query to SCP to wait for further instructions on how to proceed. This query is usually called a trigger. Trigger criteria are defined by the operator and may include the subscriber calling number or the dialed number.

Figure 6:
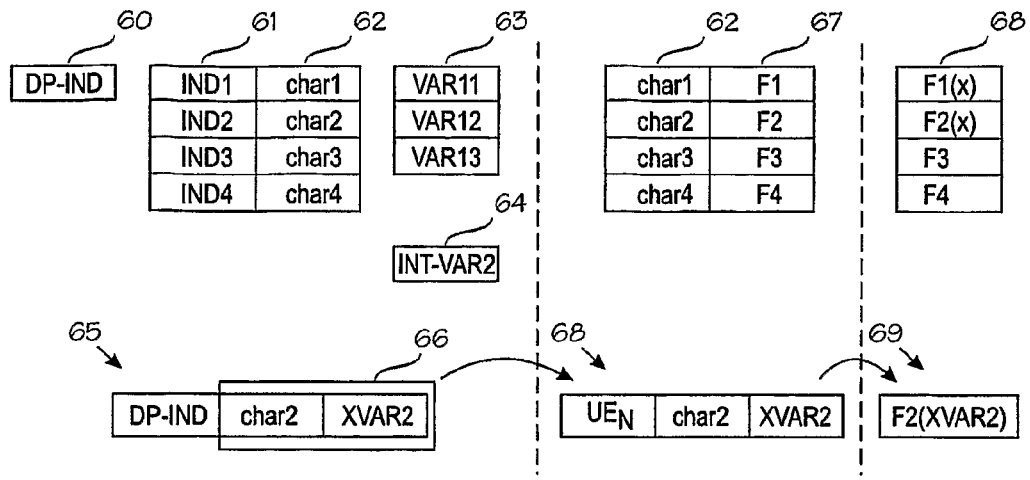
FIG. 6 illustrates exemplary transmission and mapping procedures.

FIG. 6 illustrates exemplary transmission and mapping procedures between the information processed in the user equipment, the intermediate IN service control point and the control node of the tracking service. In the present embodiment the basic procedure is enhanced by utilizing the trigger mechanism of the IN architecture to manage the routing to the service control point and utilize the number space in the IN addressing to deliver the information for detection of the function and possible also some variable information to be used in implementation of the function.

In the user equipment end there is stored an indicator DP-IND 60 that in the present network associates with the embodied tracking service and may be used to make SSP to invoke a query to SCP of the tracking service. In the present embodiment, '*500*' represents a digit string set to correspond to this indicator. FIG. 6 illustrates only data sets related to one service, but it is clear that user equipment may comprise separate data sets for more that one services. As in FIGS. 3A and 3B, the user equipment stores information on predefined indications 61 IND1, . . . , IND4 that associate with a particular service operation in the user end. In this embodiment these indications are represented with digit strings 62 chart1, . . . char4, that form the whole or a part of digits of a target address in a call setup request. These digit strings comprise information that may be used to identify a function of the service operation to be performed in the control node end. In case not all digits of the applied numbering scheme are needed to indicate the function, part of the target address may be used to deliver one or more variable values to be utilized at performing the function in the control node end. For simplicity, an example using one delivered variable is discussed in the following. The amount of variables may be adjusted by different allocation of digits to address part and variable part in the generated target address. For correct interpretation, it is naturally clear that the format of the target address needs to be carefully predefined.

In the present embodiment, for one or more indications there is stored a set of predefined values 63 or an input procedure 64 for determining a variable value to be associated with an activated indication. A set of predefined variables may be implemented, for example, as a table of values 63 that the user may select through the user interface, of that may be selected by a user application. The input procedure 64 may be implemented, for example, as a user equipment application that retrieves an input, for example, a user input or an operational parameter of the user equipment, computes a result value from that input using a predefined function, and outputs the result value as the predefined value to be provided with the indication.

Let us assume, for example, that the user equipment comprises an application that measures the battery level of the user equipment and keeps the control node informed on the battery level such that necessary actions may be decided and initiated in the control node end. This application is configured to activate IND2 at defined intervals, and provide the measured battery level BATT1 as an input value to be delivered to the tracking service. When an indication IND2 is activated, the user equipment generates a target address that comprises the IN service indicator DP-IND '*500*', and a digit string char2 that corresponds to the activated indication IND2. In the example of FIG. 6, the digit string corresponding to IND2 is '1234'. In addition, the target address may comprise a variable to be used in performing the operational function associated to IND2. For example, at activating IND2, also the input procedure INTVAR2 is invoked and the measured value BATT1 is adapted to a form XVAR2 that allows delivery of the measured value with the call setup request to the network. In the example this is made by truncating a measured value 3,87956 V to predefined four-digit form '0388'.

Accordingly, in the present example the final generated target address is of the form *500*12340388#. User equipment generates a call setup request 65 targeted to this address 66 and transmits it to the network. According to the IN procedures, the call setup message or a request compiled from the information on the call setup request is forwarded to the SCP of the tracking service. As shown in FIG. 6, SCP stores the digit strings char1, . . . , char4, and relates them to a group of operational functions 67 F1, . . . , F7 that correspond to the service operations with the user equipment indications. The relationship may be a one-to-one mapping between a digit string in the target address and an operational function, such that the whole digit string is used to identify the operational function and no variable information is delivered. The relationship may also be a hierarchic multipart mapping, where parts of the digit string relate to different selections. For example, the digit string may be configured such that the first digit after the IN service indicator indicates the type of the function and the second digit indicates the function itself.

From the call setup request, SCP determines the identity $UE_N$ of the calling subscriber, extracts the digit string and determines the corresponding operational function 'F2' to be performed in the control node. SCP also checks whether the digit string corresponds to a function without further information or whether the target address comprises also variable information. If such variable information XVAR2 is included in the target address, it either forwards the information in the format as it was received to the control node, or transforms the variable to a format accepted by the control node. SCP compiles this information into a message 68 and forwards this message to the control node CTN.

When the control node receives this message, it extracts the information in it, and performs the function F2 using the subscriber information of the user of $UE_N$ and the variable information $X_{VAR2}$ received in the message.

Figure 7:
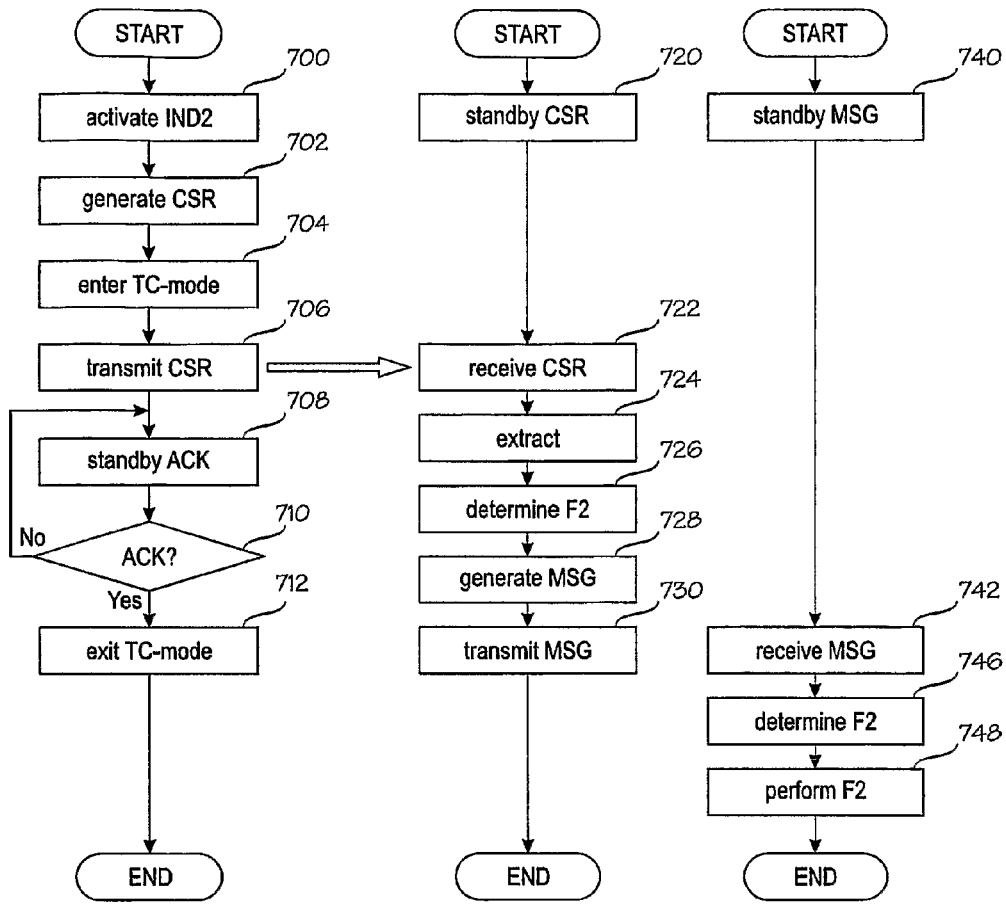
FIG. 7 illustrates stages of an exemplary method implemented in the user equipment, the IN service control point and the control node.

FIG. 7 illustrates stages of an exemplary method implemented in the user equipment, the IN service control point and the control node in a system according to the embodiment of FIG. 6. Accordingly, the description concentrates on the method, and the more detailed description on the information in the delivered messages may be referred from the description of FIG. 6.

The procedure in the user equipment begins in a stage where the user equipment is in one of its standby modes, i.e. not in the transceiving mode. The user equipment comprises the application that measures the battery level of the user equipment and at defined time intervals sends the measured value to the control node. Accordingly, at a defined time, the application inputs a measured value xvar2 and activates indication IND2 (step 700) stored in the user equipment.

The user equipment maps (step 702) the indication IND2 to the corresponding digit string 'char2" and formats the measured value xvar2 into a digit string XVAR2 that is accepted by SCP. The user equipment enters (704) transceiving mode and transmits (step 706) the call setup request targeted to '*char2XVAR2' to the network. After sending the call setup request the user equipment remains in the transceiving mode and is standby (step 708) for receiving an acknowledgement to the call setup request from the network. Again, the network as such may operate conventionally such that the mobile switching canter (MSC) acknowledges the call setup request by sending an acknowledgement message through the base station subsystem to the user equipment. When this acknowledgement message reaches the user equipment (step 710), it exits the transceiving mode (step 712), and the basic procedure in the user equipment end terminates.

The procedure in the IN SCP begins in a stage where SCP is in operation and becomes standby (step 720) for receiving triggered messages from MSC. A call setup request of $UE_N$ received in MSC triggers a request from MSC to the SCP; the message may be the original call setup request received by MSC or a modified query message generated by the MSC. When this message is received in SCP (step 722), SCP extracts (step 724) from the message the digit string char2 and XVAR2 and determines (step 726) the function F2 to be performed in the control node. SCP generates (step 728) a message MSG that is targeted to the actual address of the control node and comprises information identifying the user $UE_N$, the operational function F2 and the associated variable information XVAR2, and returns the message MSG (step 730) to MSC for delivery to the control node. This terminates the basic procedure in the IN SCP.

The procedure in the control node begins in a stage where the control node is in operation and standby (step 740) for receiving messages from the network. When the control node receives (step 742) MSG it determines (step 744) the function F2 to be performed and the associated variable information XVAR2 and using the subscriber information of the user $UE_N$ and XVAR2 performs the operational function F2. This terminates the basic procedure in the control node.

It should be noted that only steps relevant for illustrating the present invention are shown in FIGS. 4 and 6. Also the order of steps in individual elements may be changed without deviating from the scope of protection.

With the disclosed arrangement the basic advantages of quick delivery of information, reduced power consumption and improved control of fees may be achieved as discussed with the first embodiment. In addition, in the present embodiment the IN architecture manages routing of a plurality of addresses to one network node such that part of the available digits in the target address may be utilized to deliver also variable information in this expedited manner from the user equipment to the control node.

Consequently, let us assume the call is initiated by the tracking device and the IN service identifier '*500*' is given in the first part of the called number. Typically the number of digits in the target address is higher than the number of digits in the IN service identifier. This means that in addition to the identifier, at least part of the remaining digits can be used for passing additional information between the endpoints. For example, in 3rd Generation Partnership Project (3GPP) systems up to 27 digits would be available for this type of use. The remaining digits could be used, for example such that the first digit defines the type of message being sent: (command, data), the second digit defines command or data structure, and the following digits define the subcommand and/or data values. This way it is possible to code the necessary digits into an ordinary B-subscriber number.

In this view, for example *500*21038806666661777777* could mean:
*500*=IN service identifier
first digit 2=this is a data message
second digit 1=this is a basic system heart beat report
following 0388=battery voltage is 3.88 volts
following 0666666=longitude is 66.6666
following 1777777=latitude is 177.7777.

The same coded into an ordinary B-subscriber number would be 045772103880666661777777 where the part 04577 corresponds to an exemplary area code.

Correspondingly, 045771510700110013001800 could mean:
04577=area code for encoded numbers
first digit 1=this is a command message
second digit 5=this is a command to set reporting times
third digit 1=apply this reporting change for one day
following 0700=sent first standard report at 7:00
following 1100=sent first standard report at 11:00
following 1300=sent first standard report at 13:00
following 1800=sent first standard report at 18:00.

Correspondingly, 045771811144515003001 could mean:
04577=area code for encoded numbers
first digit 1=this is a command message
second digit 8=this is a command to set into calendar an exercise
third digit 1=turn on reminder for this event
following 1445=reminder time is 15:00
following 1500=start time of exercise is 15:00
following 30=exercise is to be training effect level 3.0
following 01=follow route 01.

Correspondingly, 045771910666661777777 could mean:
04577=area code for encoded numbers
first digit 1=this is a command message
second digit 9=this is a request of report with location aiding
third digit 1=report request is report with location and battery status
following 0666666=tracking device's (100) assumed longitude is 66.6666
following 1777777=tracking device's (100) assumed latitude is 177.7777.

The proposed solution may be further developed to allow also delivery of information to the other direction, i.e. from the control node to the user equipment. It is clear that the target address in communication from the control node to the user equipment needs to be the address of the user equipment. However, the user equipment may be adapted to read the A-subscriber number of messages it receives, and if the A-subscriber number of a message it receives matches with a defined address of the service, it interprets the address to correspond with an operational function of the user equipment, and performs this operational function.

In case of the embodiment of FIGS. 3A and 3B, the defined address may be one of the target addresses used to provide an indication towards the network. In case of the IN architecture, the control node may send the information to be forwarded to the user equipment to SCP. The SCP encodes the information to the A-subscriber number and forwards this information to the user equipment. Since the key information is derivable from the A-subscriber number of a signaling message, any signaling message may be used for this purpose. Advantageously, a call setup request is also applied in this direction.

Thus, if the number of the calling subscriber matches with one of the addresses associated with the service in the user equipment, the user equipment maps the address to an operational function and performs the function. For example, a particular A-subscriber number '04577151009' may in the user equipment be associated with a command to change schedule for battery level report times from 'daily' to 'twice a day'. In case of the first embodiment, the address associated with the service may be one of the target addresses associated with the control node. In case of the IN architecture, the user equipment stores a set of A-subscriber addresses and a corresponding set of user equipment functions.

Figure 8:
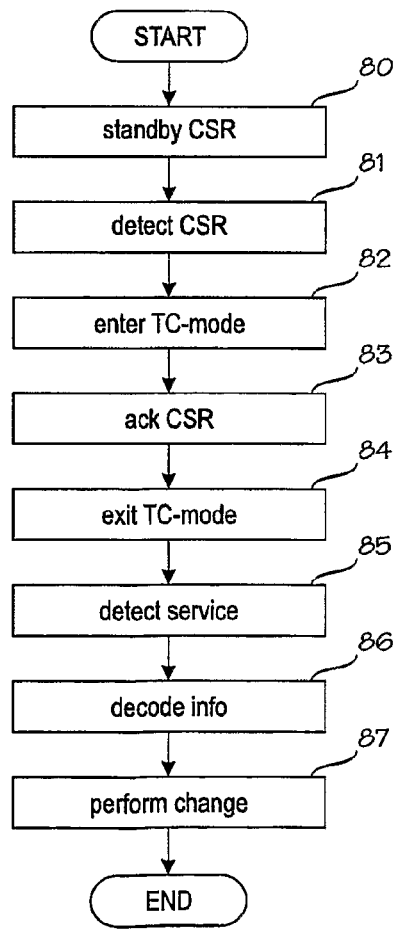
FIG. 8 illustrates steps of a method embodied in the user equipment.

FIG. 8 illustrates steps of a method embodied in the user equipment of the embodied system of any of FIGS. 2A to 2D or FIG. 5. The procedure begins at a stage where the user equipment is in one of its idle modes where it is standby for call setup requests (step 80). When such request is detected (step 81), the user equipment moves to transceiving mode (step 82) and receives a signaling message carrying a calling subscriber number Aaddr1. The user equipment acknowledges the signaling message (step 83) and exits (step 84) transceiving mode. The user equipment detects (step 85) the number to be one associated with the tracking service and decodes (step 86) the number to a command CMD1 to 'change schedule for battery level report times from DAILY to TWICE A DAY'. The user equipment implements (step 87) the requested change of schedule and terminates the procedure. It should be again noted that the order of the steps may be changed without deviating from the scope of protection. For example, the user terminal may decode the command and perform the operational function before exiting the transceiving mode.

In order to have positive feedback for success of each communication a further confirmation call method can be deployed. If the call was initiated by the tracking terminal, SCP will hang up the call as soon as it has received the B-subscriber number. SCP will then immediately call back to the tracking device from a specified number, which is recognized by the tracking device as a acknowledgement of successful transmission. Likewise a similar process can be used in the case that the call has been initiated by the control node.

Figure 9:
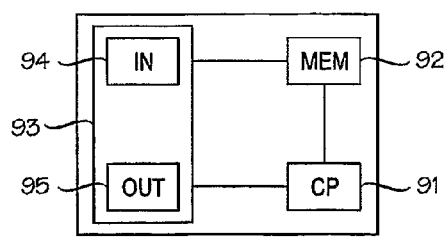
FIG. 9 illustrates a functional hardware description for user equipment, service control point, or a control node.

FIG. 9 illustrates an exemplary hardware configuration for the implementation of an apparatus applicable as network node or user equipment in the above embodiments. The apparatus comprises a processing unit 91, an element that comprises an arithmetic logic module; a number of special registers and control circuits. Connected to the processing unit is a memory unit 92, a data medium where computer-readable data or programs or user data can be stored. The memory means typically comprise memory modules that allow both reading and writing, erasable programmable read-only memory modules and memory modules whose contents can only be read. The unit also comprises an interface block 93 with input unit 94 for inputting data for internal processing in the element, and output unit 95 for outputting data from the internal processes of the element.

Examples of said input unit 94 in a network node comprise plug-in units acting as a gateway for information delivered to its external connection points. For receiving information from the operator of the network element, the input unit 84 of the network node may also comprise a keypad, or a touch screen, a microphone, or the like. Examples of said output unit 95 in network node include plug-in unit feeding information to the lines connected to its external connection points. For outputting information to the operator of the network element, the output unit 95 may also comprise a screen, a touch screen, a loudspeaker, or the like.

The interface block 93 of the user equipment typically comprises at least a user interface unit for communicating with the user and a radio interface unit for communication over the cellular mobile network. In addition, the user terminal may comprise additional interface units, for communication over another type of cellular network, or in another frequency, or for local communication. Examples of the technologies used for the local communication comprise Wireless Local Area Network (WLAN), Wi-Fi, Wi-Max Bluetooth, Infrared, use of cables, etc. Depending on the application, the implementation of said interface units may comprise a plug-in unit exchanging information through lines connected to external connection points of the user terminal, or light/radio transceiver units with appropriate protocol stacks in the user terminal.

The processing unit 91, memory unit 92, and interface block 93 are electrically interconnected for performing systematic execution of various operations on the received and/or stored data according to the predefined, essentially programmed processes of the element. The computer programs comprise instructions for executing a computer process for implementing the logical units, operations and interfaces of the user equipment and network node, as has been described above. The various embodiments of the invention may be implemented as a combination of computer programs and the respective units disclosed above.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Typically tracking service provides to its subscribers a lifeline that needs to be maintained continuously in any kind of environments. The proposed method of delivering information coded in a subscriber address provides a reliable method for transferring vital application information between a network node and the user equipment. The embodied solution, however, provides also an alternative or additional method to deliver subscriber-specific information without having to carry it in the payload of a data message.

Figure 10:
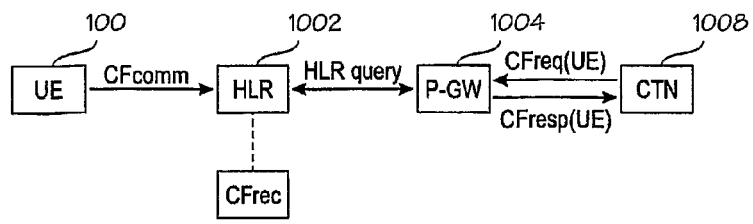
FIG. 10 illustrates user equipment, a control node and a home location register of the subscriber.

FIG. 10 illustrates the user equipment UE 100, the control node 108 and a home location register (HLR) 1002 of the subscriber that uses the user equipment UE 100. Most systems provide a destination re-routing service, for example a call forwarding service that gives the subscriber the ability to forward incoming calls to another number if the called mobile unit is not reachable, if it is busy, if there is no reply, or if call forwarding is allowed unconditionally. Destination re-routing commands are typically delivered as service codes and stored in the home location register of the subscriber. The content of the service code typically comprises address information of a number to which the session in the specified case should be routed. In the further embodiment, this address information is replaced by information that is relevant for the application, in this case for the embodied tracking service.

For example UE 100 may send a call forwarding command CFcomm **61*21166666177777# that would mean:
  **61*=is "forward calls if not answered" command
  first number 2=this is a data message
  second number 1=this is a basic system heart beat report
  following 166666=longitude offset is 16.6666
  following 177777=latitude offset is 17.7777
  # is the end of command character.

The part of the coded message that follows the command identification **61* conventionally comprises a C-number, i.e. a number to which the call is forwarded, if the A-subscriber does not answer. In this embodiment, this part is replaced by a character set that comprises one or more fields, which identify the type of the message, refer to a function of the service, and carry application data for the identified function. In this example, the application data comprises information that status information (e.g. location information) provided as heart beat reports for the tracking service.

HLR may store this call forwarding information conventionally into a record CFrec of the subscriber information of the subscriber UE. Typically the call forward command protocols provide a mechanism for UE to query its own call forwarding information. For example, in order to have positive feedback on successful storing of the above message into HLR, UE can call *#61# and receive via the system the call forwarding information, including the C-number stored in the record CFrec of HLR. UE may match this information with the information UE sent to the network, and thereby verify that the information is stored in appropriate form in HLR.

The call forwarding information in HLR may be accessed also from the network side. Typically network operators provide to a group of virtual operators a controlled interface through which the virtual operators may implement a group of operations in the network. Typically these operations relate to provisioning and serve to input some subscriber information to the network databases and query information from these network databases. In the present embodiment this interface is implemented as a conventional provisioning gateway P-GW 1004 accessible by the control node CTN 108. CTN may thus send to P-GW a query CFreq(UE) that requests call forwarding information of a particular subscriber UE. P-GW accesses the HLR information and returns a response CFresp(UE) comprising the requested call forwarding information to CTN.

Figure 11:
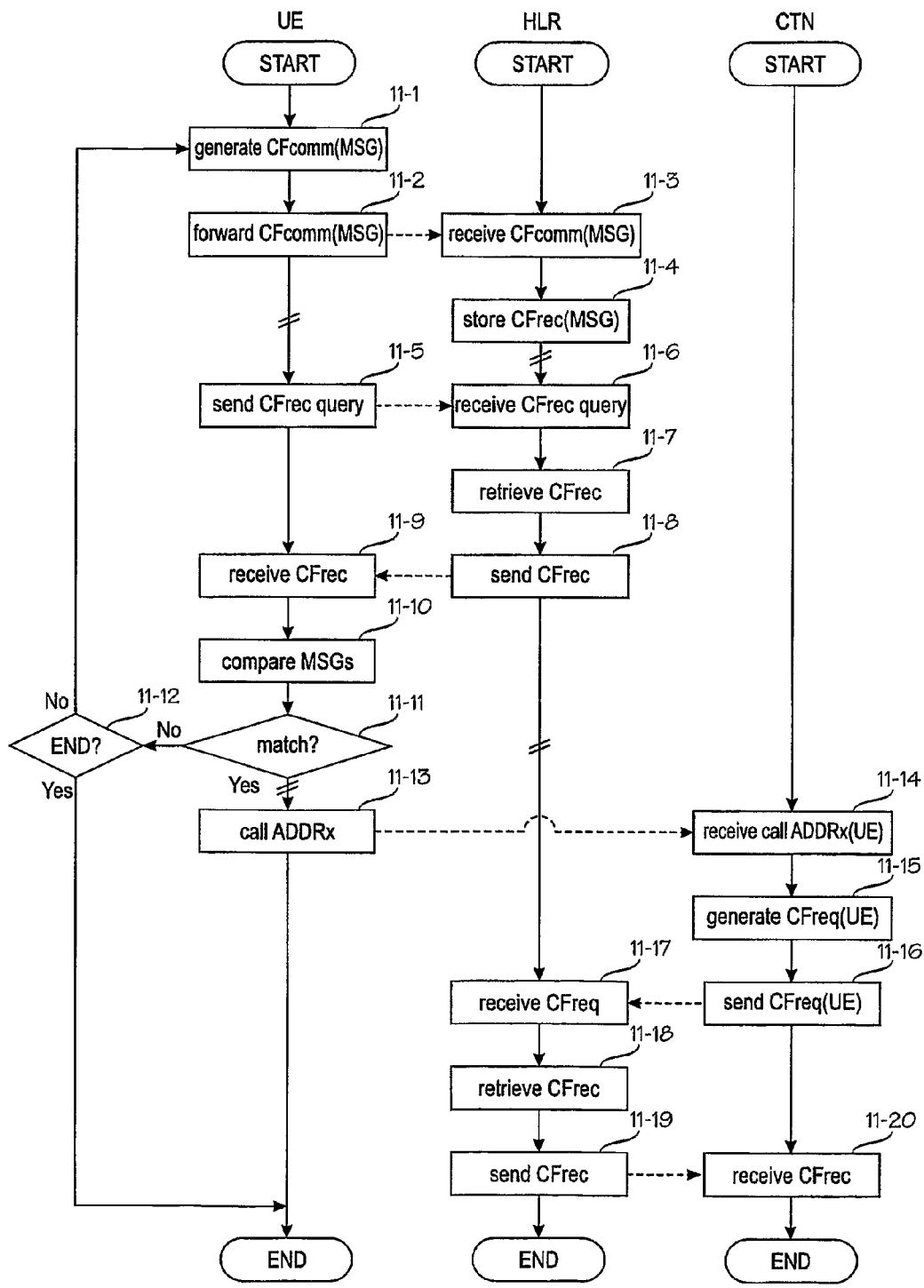
FIG. 11 illustrates stages of an exemplary method implemented with the command and query mechanisms and the elements presented in FIG. 10.

FIG. 11 illustrates stages of an exemplary method implemented with the command and query mechanisms and the elements presented in FIG. 10. The example of FIG. 11 relates to a case where UE delivers the exemplary latitude and longitude offset information to CTN. The HLR and P-GW elements may operate conventionally, essentially no new operations are required in them to implement the procedure. Especially P-GW acts essentially as an intermediate between CTN and HLR, so for conciseness its role is not included in FIG. 11. The procedure begins at a stage where all elements are switched on and operative and UE has determined values indicating its position, for example its longitude and latitude offset values.

UE generates (step 11-1) a call forwarding command CFcomm(MSG), where the conventional C-number information is replaced with application information. In this example the application information is in form of a series of characters MSG that identify a functionality and message type applied in the tracking service and includes the latitude and longitude offset information applicable in the optionally identified functionality of the tracking service. UE forwards (step 11-2) CFcomm(MSG) to HLR that receives (step 11-3) CFcomm (MSG) and stores (step 11-4) the call forwarding information into a record CFrec(UE) of subscriber information of UE.

At some stage after sending CFcomm(MSG), UE may send (step 11-5) to HLR a query Q(CFrec) that requests information on its own call forwarding information stored in HLR. When HLR receives (step 11-6) the query, it retrieves (step 11-7) the stored call forwarding information and sends (step 11-8) it to UE. When UE receives (step 11-9) the call forwarding information, it may compare (step 11-10) the received call forwarding information with the determined location status information. If (step 11-11) the two pieces of information do not match. UE may decide (step 11-12) to end the procedure or move back to step 11-1 and retry delivery of the call forwarding command to HLR. If (step 11-11) the two pieces of information match. UE may move forward to inform CTN on new information in HLR.

This embodiment is especially applicable to services where information needs to be delivered quickly and reliably even in environments where various data services are not available or might incur significant costs. Advantageously the notification from UE to CTN is thus made in form of a message delivery attempt, i.e. by forwarding a session setup request towards an address managed by CTN. Typically voice services are prioritized over data services, so in challenging communications environments, or in congested radio interfaces, calls are much longer available than data services, and may remain available even if data services are interrupted or restricted. A call attempt is also typically free of charge, so it does not incur costs to the UE notifying CTN. In the present example, the notification is thus made by UE calling (step 11-13) a predefined address ADDRx that is in control of the control node.

The control node CTN stores a group of one or more addresses, one of which is ADDRx, and an application function Fx associated to it. In this example, when CTN receives (step 11-14) the call it recognizes the address ADDRx and maps it the application function Fx "retrieve call forwarding information from HLR". CTN also determines the address of the caller. CTN thus generates (step 11-15) a query CFreq (UE) that requests the defined call forwarding information, here the C-number, from the subscriber database of UE. CTN sends (step 11-16) this query CFreq(UE) via P-GW to HLR.

When HLR receives (step 11-17) the request, it retrieves (step 11-8) the record CFrec(UE) and sends (step 11-19) the call forwarding information in the record via P-GW to CTN, When CTN receives the call forwarding information, it extracts the application information and applies it in implementing the service. In this example, CTN identifies that the message comprises a data message that is a heartbeat report of the tracking service and includes location information of the subscriber. This information may thus be updated to a tracking database and applied in the operations of the tracking service.

Figure 12:
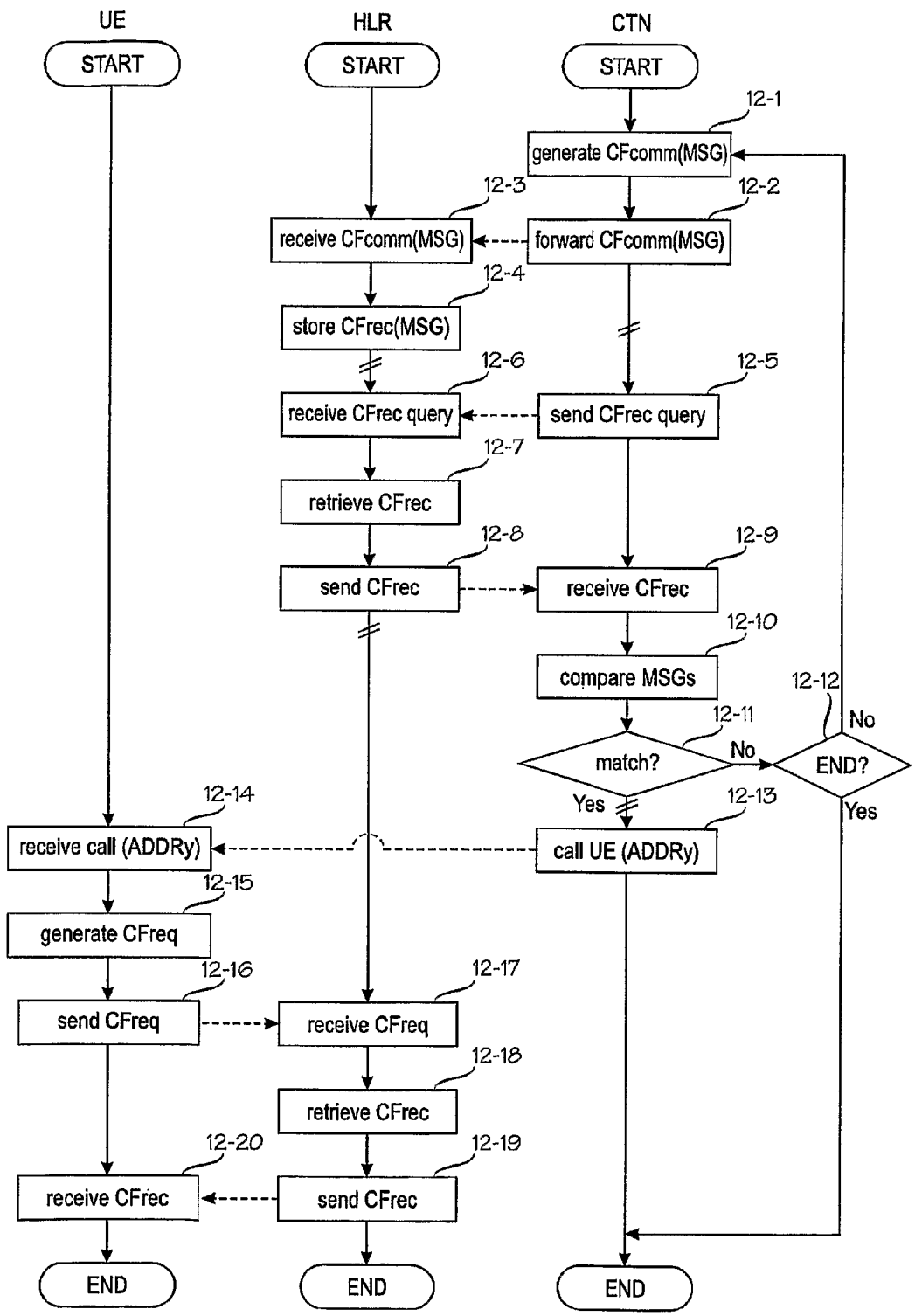
FIG. 12 illustrates stages of another exemplary method implemented with the command and query mechanisms and the elements presented in FIG. 10.

The mechanism applying destination re-routing may be reversely applied also to the other direction, i.e. for delivering application information from the control node CTN to the user equipment UE. For example, in the configuration of FIG. 10, CTN may include similarly application data in call forwarding information and use P-GW to input the call forwarding information to the subscriber database of UE. FIG. 12 illustrates stages of an exemplary method implemented with the command and query mechanisms and the elements presented in FIG. 10. The example of FIG. 12 relates to a case where CTN delivers application information within a destination re-routing information to UE. The procedure begins at a stage where all elements are switched on and operative CTN has application information MSG it needs to deliver to UE.

CTN generates (step 12-1) a call forwarding command CFcomm(MSG), where the conventional C-number information is replaced with application information. In this example the application information is in form of a series of characters MSG. CTN forwards (step 12-2) CFcomm(MSG) to HLR that receives (step 12-3) CFcomm(MSG) and stores (step 12-4) the call forwarding information into a record CFrec (UE) of subscriber information of UE.

At some stage after sending CFcomm(MSG), CTN may send (step 12-5) to HLR a query Q(CFrec) that requests information on call forwarding information of UE stored in HLR. When HLR receives (step 12-6) the query, it retrieves (step 12-7) the stored call forwarding information and sends (step 12-8) CFrec to CTN. When CTN receives (step 12-9) the call forwarding information of UE, it may compare (step 12-10) it with the application data it intended to send to UE. If (step 12-11) the two pieces of information do not match, CTN may decide (step 12-12) to end the procedure or move back to step 12-1 and retry delivery of the call forwarding command to HLR. If (step 12-11) the two pieces of information match, CTN may move forward to inform UE on new information in HLR.

Advantageously the notification from CTN to UE is also made in form of a message delivery attempt, like a call setup request. Thus CTN calls (step 12-14) UE from ADDRy, one of the addresses that are in its control.

As above, UE stores a group of one or more addresses, one of which is ADDRy, and an application function Fy associated to it. In this example, when UE receives (step 12-14) the call it recognizes the address ADDRy of the caller and maps it the application function Fy "retrieve call forwarding information from HLR". UE thus generates (step 12-15) a query CFreq(UE) that requests its own call forwarding information, and sends (step 12-16) it to HLR.

When HLR receives (step 12-17) the request CFreq(UE), it retrieves (step 11-8) the record CFrec(UE) and returns (step 12-19) the call forwarding information in the record to UE, When UE receives the call forwarding information, it extracts the application information and applies it in implementing the service.

The embodied solution provides a resilient and power-saving mechanism to exchange information between two nodes. The solutions is specifically advantageous in situations where normal data services that apply message payload or ubiquitous dedicated signaling messages are not available, or need to be avoided for some reason, for example, for reducing the communications costs incurred to the user equipment.

It will be obvious to a person skilled in the art that, as the technology advances, the inventive concept can be implemented in various ways. The invention and its embodiments are not limited to the examples described above but may vary within the scope of the claims.

The invention claimed is:

1. A system comprising a first node, a second node and a telecommunication network operatively connecting the first node and the second node, wherein
the first node has access to a subscriber database comprising information on subscribers to a defined service and is configured with a set of predefined functions associated with a group of addresses of the telecommunication network such that a session setup request targeted to any address in the group of addresses is routed to the first node, and each address in the group of addresses is associated with at least one of the predefined functions;
the second node is configured to send a session setup request to a target address that corresponds to an address in the group of addresses, the session setup request comprising the target address, said target address including an indication of the predefined function and said target address including at least one variable of the predefined function associated with the target address, the at least one variable comprising a battery status of the second node and/or sensor value information; and
the first node is configured to determine the sender of the session setup request, determine the predefined function to be performed on the basis of the target address in the session setup request, determine the at least one variable in the session setup request, and perform the function using the information on the determined sender of the session setup request and the determined at least one variable, wherein the target address is a subscriber number of the telecommunication network and the function comprises storing the indication and the at least variable conveyed by the target address to an appropriate record or forwarding the indication and the at least variable to a predefined address of the telecommunication network.

2. The system according to claim 1, wherein the defined service is a tracking service and the first node is a control node of the tracking service.

3. The system according to claim 1, wherein
the first node is an intelligent network service control point;
the first node is configured to generate a message identifying the determined function and the sender of the session setup request; and
the first node is configured to send the generated message to another network node.

4. The system according to claim 3, wherein the first node is configured to determine a service the sender of the session setup request is subscribed to; and
the first node is configured to send the generated message to a control node of the service.

5. The system according to claim 3, wherein the second node is configured to generate a target address that comprises an intelligent network identification part, a function identification part and a function variables part, where the intelligent network identification part enables routing of the session setup request to the intelligent network service control point, and the function identification part enables determination of the function to be performed and the function variables part comprises one or more variables to be used in performing the function.

6. The system according to claim 1, wherein the second node is configured with a set of predefined functions associated with a group of addresses of the telecommunication network such that each address in the group of addresses is associated with at least one of the predefined functions;

the first node is configured to send a signaling message to the second node using a source address that corresponds to an address in the group of addresses; and the second node is configured to determine the function to be performed on the basis of the source address in the signaling message.

7. The system according to claim 1, wherein either of the first node and the second node is configured to store service data within destination re-routing information of the second node in a subscriber database of the system, and the other node is configured to retrieve the service data from the subscriber database with a destination re-routing information query.

8. A network node for a telecommunications system, comprising: a subscriber database comprising information on subscribers to a defined service;

a memory configured to store a set of predefined functions and a group of addresses of the telecommunication network such that a session setup request targeted to any address in the group of addresses is routed to the network node, and each address in the group of addresses is associated with at least one of the predefined functions;

an interface unit configured to receive a session setup request comprising a target address that corresponds to an address in the group of addresses, the session setup request comprising the target address, said target address including an indication of the predefined function and said target address including at least one variable of the predefined function associated with the target address, the at least one variable comprising a battery status of the second node and/or sensor value information; and a control unit operatively connected with the memory and the interface unit and configured to operate the network node to determine the sender of the session setup request; determine the predefined function to be performed on the basis of the target address in the received session setup request, retrieve from the subscriber database information on the sender of the session setup request, determine the at least one variable in the session setup request, and to perform the function with the subscriber information on the determined sender of the session setup request and the determined at least one variable, wherein the target address is a subscriber number of the telecommunication network and the function comprises storing the indication and the at least variable conveyed by the target address to an appropriate record or forwarding the indication and the at least variable to a predefined address of the telecommunication network.

9. The network node according to claim 8, wherein the defined service is a tracking service and the network node is a control node of the tracking service.

10. The network node according to claim 9, wherein the control unit is configured to operate the network node to receive a session setup request, and to retrieve from the target address an intelligent network identification part, a function identification part and a function variables part, where the intelligent network identification part enables routing of the session setup request to the intelligent network service control point, the function identification part enables determination of the function to be performed and the function variables part comprises one or more variables to be used in performing the function.

11. The network node according to claim 8, wherein the network node is an intelligent network service control point and the control unit is configured to operate the network node to determine the sender of the session setup request, to generate a message identifying the determined function and the sender of the session setup request, and to transmit the generated message to another network node.

12. The network node according to claim 11, wherein the control unit is configured to operate the network node to determine a service which the sender of the session setup request is subscribed to and send the generated message to a control node of said service.

13. The network node according to claim 8, wherein the network node comprises information on a set of predefined functions of a user equipment, the set of predefined functions being associated with a group of addresses of the telecommunication network such that each address in the group of addresses is associated with at least one of the predefined functions; and the network node is configured to send a signaling message to the user equipment using a source address that corresponds to an address in the group of addresses.

14. The network node according to claim 8, wherein the network node is configured to store service data within destination re-routing information of the user equipment in a subscriber database of the system.

15. The network node according to claim 8, wherein in response to a defined target address in the received session setup request the network node is configured to retrieve service data from a subscriber database of the calling subscriber with a destination re-routing information query.

16. User equipment for a telecommunications system, comprising:

a memory configured to store information on a set of predefined functions;

an interface unit configured to communicate with elements of the telecommunications system;

a control unit operatively connected with the memory and the interface unit and configured to operate the user equipment to select a function to be performed in a control node;

determine a target address that corresponds with the predefined function to be performed, said target address including an indication of the predefined function;

determine at least one variable of the predefined function associated with the target address, the at least one variable comprising a battery status of the second node and/or sensor value;

enter transceiving mode and send a session setup request to the target address, the session setup request comprising the target address and the determined at least one variable, wherein the at least one variable is included in said target address;

receive from a network node an acknowledgement on receipt of the session setup request; and exit transceiving mode, in response to receiving the acknowledgement, wherein the target address is a subscriber number of the telecommunication network and the function comprises storing the indication and the at least variable conveyed by the target address to an appropriate record or forwarding the indication and the at least variable to a predefined address of the telecommunication network.

17. The user equipment according to claim 16, wherein the control unit us configured to operate the user equipment to generate a target address that comprises an intelligent network identification part, a function identification part and a function variables part, where the intelligent network identification part enables routing of the session setup request to the intelligent network service control point, and the function identification part enables determination of the function to be performed and the function variables part comprises one or more variables to be used in performing the function.

18. The user equipment according to claim 16, wherein the user equipment is configured with a set of predefined functions associated with a group of addresses of the telecommunication network such that each address in the group of addresses is associated with at least one of the predefined functions;
the user equipment is configured to receive from a network node a signaling message having a source address; and
the user equipment is configured to determine a function to be performed on the basis of the source address in the signaling message.

19. The user equipment according to claim 18, wherein in response to a defined source address in a received session setup request the user equipment is configured to retrieve service data from its subscriber database with a destination re-routing information query.

20. The user equipment according to claim 16, wherein the user equipment is configured to store service data within destination re-routing information of the user equipment in a subscriber database of the system.

21. A method for operating a network node of a telecommunications system, comprising:
storing a set of predefined functions and a group of addresses of the telecommunication network such that a session setup request targeted to any address in the group of addresses is routed to the network node, and each address in the group of addresses is associated with at least one of the predefined functions, the addresses in the group of addresses indicating a battery status and/or sensor information;
receiving a session setup request comprising a target address that corresponds to an address in the group of addresses, the session setup request comprising the target address, said target address including an indication of the predefined function and said target address including at least one variable of the predefined function associated with the target address, the at least one variable comprising a battery status of the second node and/or sensor value information;
determining a sender of the session setup request;
determining the function to be performed in the network node on the basis of the target address in the received session setup request;
determining the at least variable in the session setup request; and
performing the function using the information on the determined sender of the session setup request and the determined at least one variable, wherein the target address is a subscriber number of the telecommunication network and the function comprises storing the indication and the at least variable conveyed by the target address to an appropriate record or forwarding the indication and the at least variable to a predefined address of the telecommunication network.

22. A computer program product embodied on a non-transitory computer readable medium and encoding a computer program of instructions for executing a computer process for controlling functions in a network node of a telecommunications system, the process including:
storing a set of predefined functions and a group of addresses of the telecommunication network such that a session setup request targeted to any address in the group of addresses is routed to the network node, and each address in the group of addresses is associated with at least one of the predefined functions;
receiving a session setup request comprising a target address that corresponds to an address in the group of addresses, the session setup request comprising the target address, said target address including an indication of the predefined function and said target address including at least one variable of the predefined function associated with the target address, the at least one variable comprising a battery status of the second node and/or sensor value information;
determining the sender of the session setup request;
determining the function to be performed in the network node on the basis of the target address in the received session setup request;
determining the at least one variable in the session setup request; and
performing the function using the information on the determined sender of the session setup request and the determined at least one variable,
wherein the target address is a subscriber number of the telecommunication network and the function comprises storing the indication and the at least variable conveyed by the target address to an appropriate record or forwarding the indication and the at least variable to a predefined address of the telecommunication network.

23. A method for operating user equipment of a telecommunications system, comprising:
storing information on a set of predefined functions;
communicating with elements of the telecommunications system;
selecting a function to be performed in a control node of the telecommunications system;
determining a target address that corresponds the function to be performed, said target address including an indication of the predefined function;
determining at least one variable of the predefined function corresponding to the target address, the at least one variable comprising a battery status of the second node and/or sensor value information;
entering transceiving mode and sending a session setup request to the target address, the session setup request comprising the target address and the determined at least one variable, wherein the at least one variable is included in said target address;
receiving from the network node an acknowledgement on receipt of the session setup request; and
exiting transceiving mode, in response to receiving the acknowledgement, wherein the target address is a subscriber number of the telecommunication network and the function comprises storing the indication and the at least variable conveyed by the target address to an appropriate record or forwarding the indication and the at least variable to a predefined address of the telecommunication network.

24. A computer program product embodied on a non-transitory computer readable medium and encoding a computer program of instructions for executing a computer process for controlling functions in a network node of a telecommunications system, the process including:
storing information on a set of predefined functions;
communicating with elements of the telecommunications system;
selecting a function to be performed in a control node of the telecommunications system;
determining a target address that corresponds the function to be performed, said target address including an indication of the predefined function;

determining at least one variable of the predefined function corresponding to the target address, the at least one variable comprising a battery status of the second node and/or sensor value information;

entering transceiving mode and sending a session setup request to the target address, the session setup request comprising the target address and the determined at least one variable, wherein the at least one variable is included in said target address;

receiving from the network node an acknowledgement on receipt of the session setup request; and exiting transceiving mode, in response to receiving the acknowledgement, wherein the target address is a subscriber number of the telecommunication network and the function comprises storing the indication and the at least variable conveyed by the target address to an appropriate record or forwarding the indication and the at least variable to a predefined address of the telecommunication network.

* * * * *